US009812729B2

(12) United States Patent
Edmonston et al.

(10) Patent No.: US 9,812,729 B2
(45) Date of Patent: Nov. 7, 2017

(54) FUEL CELL STACK COMPRESSION DEVICES AND METHODS

(71) Applicant: Bloom Energy Corporation, Sunnyvale, CA (US)

(72) Inventors: David Edmonston, Santa Cruz, CA (US); Michael Petrucha, Santa Clara, CA (US); Martin Perry, Mountain View, CA (US); Matthias Gottmann, Sunnyvale, CA (US); Dien Nguyen, San Jose, CA (US); Emad El Batawi, Sunnyvale, CA (US); William David Lyle, San Francisco, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 0 days.

(21) Appl. No.: 14/271,158

(22) Filed: May 6, 2014

(65) Prior Publication Data

US 2014/0242492 A1  Aug. 28, 2014

Related U.S. Application Data

(62) Division of application No. 12/892,582, filed on Sep. 28, 2010, now Pat. No. 8,785,074.

(60) Provisional application No. 61/272,494, filed on Sep. 30, 2009.

(51) Int. Cl.
| | | |
|---|---|---|
| *H01M 8/24* | (2016.01) | |
| *H01M 8/04* | (2016.01) | |
| *H01M 8/248* | (2016.01) | |
| *H04N 1/00* | (2006.01) | |
| *H01M 8/04082* | (2016.01) | |
| *H01M 8/2483* | (2016.01) | |

(52) U.S. Cl.
CPC ....... *H01M 8/248* (2013.01); *H01M 8/04201* (2013.01); *H04N 1/00366* (2013.01); *H04N 1/00368* (2013.01); *H04N 1/00381* (2013.01); *H04N 1/00392* (2013.01); *H04N 1/00493* (2013.01); *H04N 1/00496* (2013.01); *H04N 1/00538* (2013.01); *H01M 8/2483* (2016.02); *H04N 2201/0094* (2013.01); *H04N 2201/0422* (2013.01); *H04N 2201/0436* (2013.01)

(58) Field of Classification Search
CPC .............................. H01M 8/248; H01M 8/2483
See application file for complete search history.

(56) References Cited

U.S. PATENT DOCUMENTS

| | | |
|---|---|---|
| 6,413,665 B1 | 7/2002 | Blanchet et al. |
| 6,720,101 B1 | 4/2004 | Dong et al. |
| 2003/0235746 A1 | 12/2003 | Haltiner et al. |
| 2004/0247982 A1 | 12/2004 | Sabin et al. |
| 2005/0048347 A1 | 3/2005 | Takashita et al. |
| 2006/0006108 A1* | 1/2006 | Arias et al. ................... 210/232 |
| 2007/0196704 A1 | 8/2007 | Valensa et al. |
| 2008/0038622 A1 | 2/2008 | Valensa et al. |
| 2008/0182152 A1 | 7/2008 | Erikstrup |
| 2008/0280178 A1 | 11/2008 | Spink et al. |
| 2008/0311457 A1 | 12/2008 | Andreas-Schott et al. |
| 2009/0246595 A1* | 10/2009 | Watanabe ............. H01M 8/247 429/406 |
| 2010/0239941 A1 | 9/2010 | Burmeister et al. |
| 2011/0076585 A1 | 3/2011 | Edmonston et al. |

FOREIGN PATENT DOCUMENTS

| | | |
|---|---|---|
| CN | 101527366 A | 9/2009 |
| EP | 2395586 A1 | 12/2011 |
| JP | 10-106610 | 4/1998 |
| JP | 2004349052 A | 12/2004 |
| JP | 2006-512543 | 4/2006 |
| JP | 2007280890 A | 10/2007 |
| JP | 2008053078 A | 3/2008 |
| WO | WO 02/27834 A2 | 4/2002 |
| WO | WO 2008/089977 A1 | 7/2008 |
| WO | WO 2008/110292 A1 | 9/2008 |

OTHER PUBLICATIONS

Supplemental European Search Report for EP 10 82 1119, completed Nov. 13, 2014 (8 sheets).
Notice of Reasons for Rejection of Corresponding Japanese Patent Application No. 2012-532243, dated Sep. 16, 2014—attached with English language translation.
International Search Report, International Application No. PCT/US2010/050577, dated Jun. 30, 2011.
International Preliminary Report on Patentability, International Application No. PCT/US2010/050577, dated Apr. 12, 2012.
European Office Communication Pursuant to Article 94(3) EPC, for European Patent Application No. 10821119.4, dated Nov. 22, 2016, 4 pages.

* cited by examiner

*Primary Examiner* — Ladan Mohaddes
(74) *Attorney, Agent, or Firm* — The Marbury Law Group PLLC

(57) ABSTRACT

A spring compression assembly is configured to apply a load to a stack of electrochemical cells. The assembly includes a ceramic leaf spring, a tensioner configured to apply pressure to a first side of the spring and a bottom plate located on a second side of the spring opposite the first side of the spring. The bottom plate is configured to transfer a load from the spring to the stack of electrochemical cells.

13 Claims, 15 Drawing Sheets

Prior Art

Fig 11. Oxide-oxide composite cross section 200micron

Fig 12. Oxide-oxide composite cross section 50micron

Fig. 13 Oxide-oxide composite cross section 20micron

FUEL CELL STACK COMPRESSION DEVICES AND METHODS

CROSS REFERENCE TO RELATED PATENT APPLICATION

This application is a divisional of U.S. application Ser. No. 12/892,582, filed Sep. 28, 2010, which claims the benefit of U.S. Provisional Application No. 61/272,494, filed Sep. 30, 2009, incorporated herein by reference in its entirety.

FIELD

The present invention is directed to fuel cell system components, such as stack compression devices and methods.

BACKGROUND

U.S. application Ser. No. 11/656,563, filed on Jan. 23, 2007 and published as US published application 2007/0196704 A1 and incorporated herein by reference in its entirety, describes a fuel cell system in which the solid oxide fuel cell (SOFC) stacks are located on a base, as shown in FIG. 1. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222. The bores or feed-throughs 224 through the baffles 220 act as heat sinks and thereby decrease the system efficiency.

In an alternative embodiment, the load is transmitted through the base 239 as this is the only zero datum of the system. Penetrations or feed-throughs through the base 239 are used in order to pull the required load from the base 239.

SUMMARY

An embodiment relates to a baffle configured to place a load on a stack of electrochemical cells and direct a reactant feed flow stream. In one aspect the baffle is made of a plurality of baffle plates. In one aspect, the baffle plates have a dovetail shaped protrusion on one end and a dovetail shaped cutout on the other end.

Another embodiment relates to a fuel cell assembly including a stack of solid oxide cells, at least one baffle, a top block, and a base, wherein the at least one baffle assembly is vertically aligned over the base and interlocks with the top block.

Another embodiment relates to a spring compression assembly configured to apply a load to a stack of electrochemical cells. The spring compression assembly includes a spring, a tensioner configured to apply pressure to a first side of the spring and a bottom plate located on a second side of the spring opposite the first side of the spring. The bottom plate is configured to transfer load from the spring to the stack of electrochemical cells.

Another embodiment relates to a kit including a plurality of baffle plates configured to be attached to a side of a stack of electrochemical cells and to place a load on the stack of electrochemical cells. The plurality of baffle plates includes cutouts. The kit also includes a plurality of inserts configured to fit in the cutouts and interlock the plurality of baffle plates.

Another embodiment relates to a fuel cell system including a fuel cell stack located over a base and a plurality of side baffles located adjacent to at least two sides of the fuel cell stack, the plurality of side baffles configured to provide a compressive stress on the fuel cell stack.

Another embodiment relates to a fuel cell system. The fuel cell system includes a fuel cell stack and an internal compression device that uses gravity and a mass of the fuel cell stack to provide a compressive force on the fuel cell stack.

DETAILED DESCRIPTION

Figure 1:
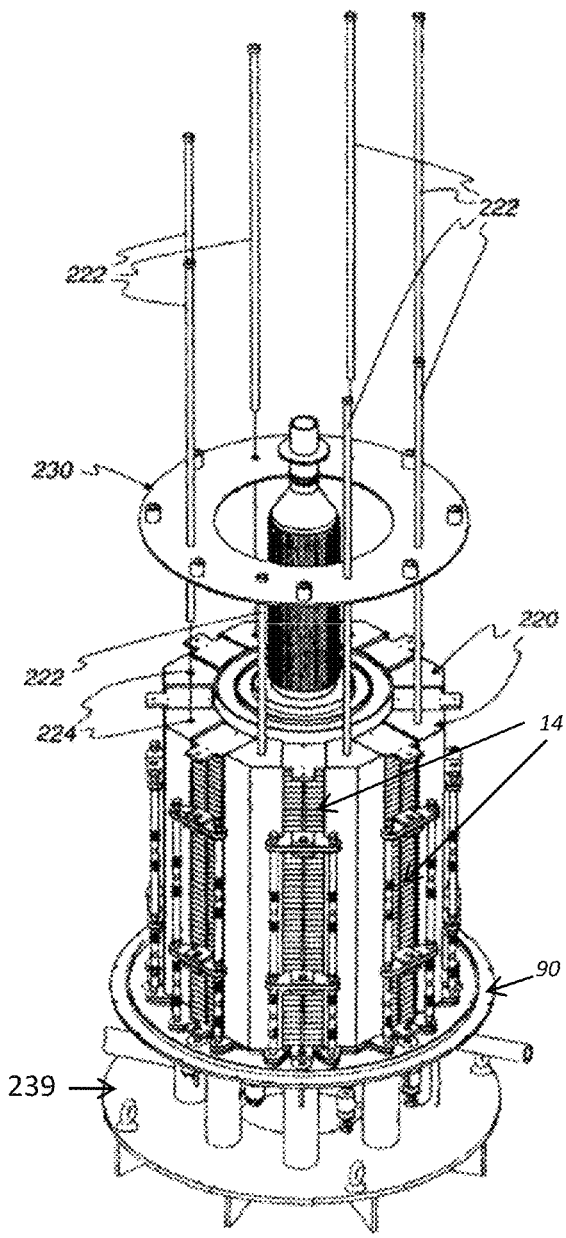
FIG. 1 illustrates a three dimensional view of a prior art fuel cell assembly.

The present inventors realized that the bores or feed-throughs 224 decrease the system efficiency because they create heat sinks. The present inventors also realized that the bores 224 can be eliminated and a compressive load applied to the fuel cell stacks 14 by redesigning the baffles 220. By applying the compressive stress with the baffles themselves, the tie rods 222 can be eliminated, and thus, the bores 224 can be eliminated. Thus, in one embodiment, the baffles lack bore holes that extend vertically through the baffles and tie rods located in the holes.

Figure 2:
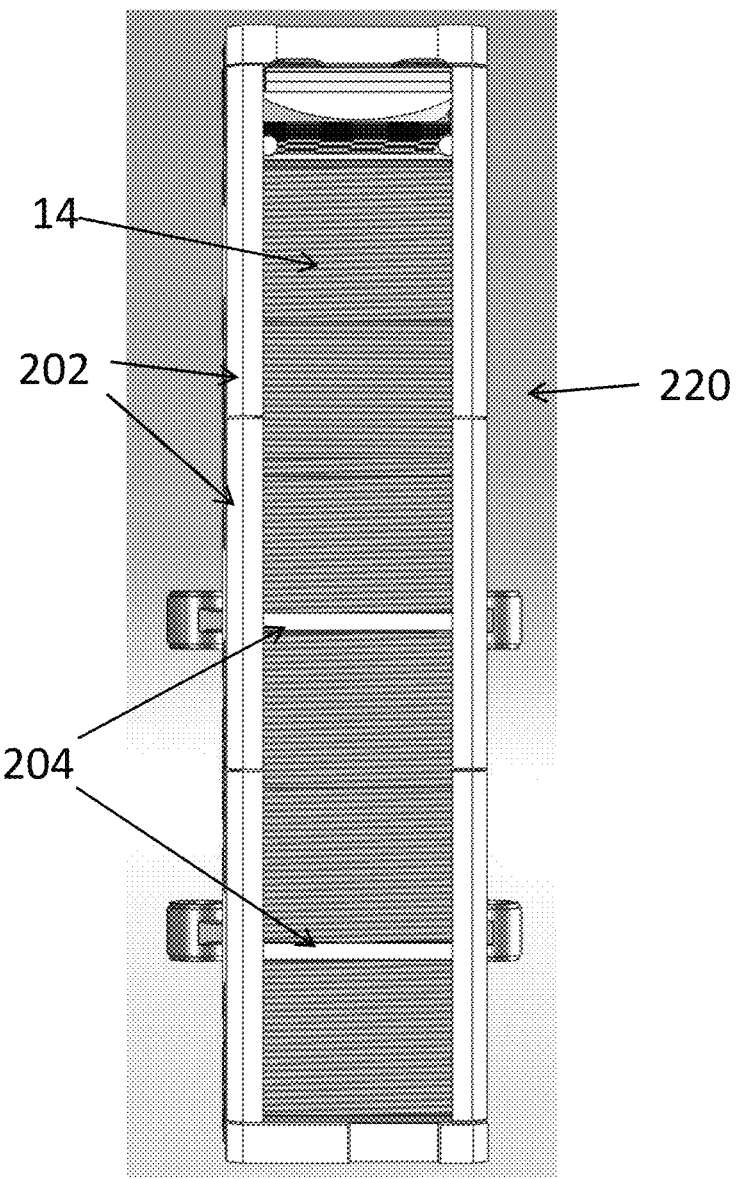
FIG. 2 illustrates a side view of an embodiment of a column of fuel cell stacks with plate shaped side baffles.

FIG. 2 illustrates a first embodiment. In this embodiment, two side baffles 220 are placed on opposite sides of the column containing one or more fuel cell stacks 14. However, more or less side baffles 220 may be used for stacks having a cross sectional shape other than rectangular. Further, one or more fuel manifolds 204 may be provided in the column of fuel cell stacks 14. An exemplary fuel manifold is described in the U.S. application Ser. No. 11/656,563 noted above. Any number of fuel manifolds 204 may be provided between adjacent fuel cell stacks 14 as desired. Further, the number of fuel cell stacks 14 in a column of fuel cell stacks 14 may be selected as desired and is not limited to the number of fuel cell stacks 14 illustrated in FIG. 2.

In this embodiment, the side baffles 220 are used to place a compressive load on the fuel cell stack(s) 14 (or column(s) of stacks). This embodiment eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks shown in FIG. 1, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 (or a column of stacks 14) from metal components in the system. The load on the stacks may be provided from any one or more load sources, such as the base 239 of the system, a block underneath the stack 14 or column of stacks, a spring assembly above the stack 14, etc.

Preferably, the ceramic side baffles 220 have a plate shape rather than wedge shape and are made from plate shaped pieces or features (e.g., baffle plates 202) rather than comprising a unitary ceramic piece. Plate shaped baffles and plates preferably have two major surfaces and one or more (e.g., four) edge surfaces. In an embodiment, one or more edge surfaces may have an area at least 5 times smaller than the major surface area. Alternatively, one or more edge surfaces may have an area at least 4 times or 3 times smaller than the major surface area. Preferably, the plates have a constant width or thickness, have a substantially rectangular shape when viewed from the side of the major surface, and have a cross sectional shape which is substantially rectangular. In an alternative embodiment, the ceramic side baffles 220 are not rectangular but may have a wedge shaped cross section. That is, one of the edge surfaces may be wider than the opposing edge surface. However, unlike the prior art baffles 220 which completely fill the space between adjacent electrode stacks 14, the side baffles 220 of this embodiment are configured so that there is space between side baffles 220. In other words, the side baffles 220 of this embodiment do not completely fill the space between adjacent fuel cell stacks 14. Preferably, the baffle plates 202 are made from a high temperature material, such as alumina or other suitable ceramic. In an embodiment, the baffle plates 202 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Figures 3A, 3B:
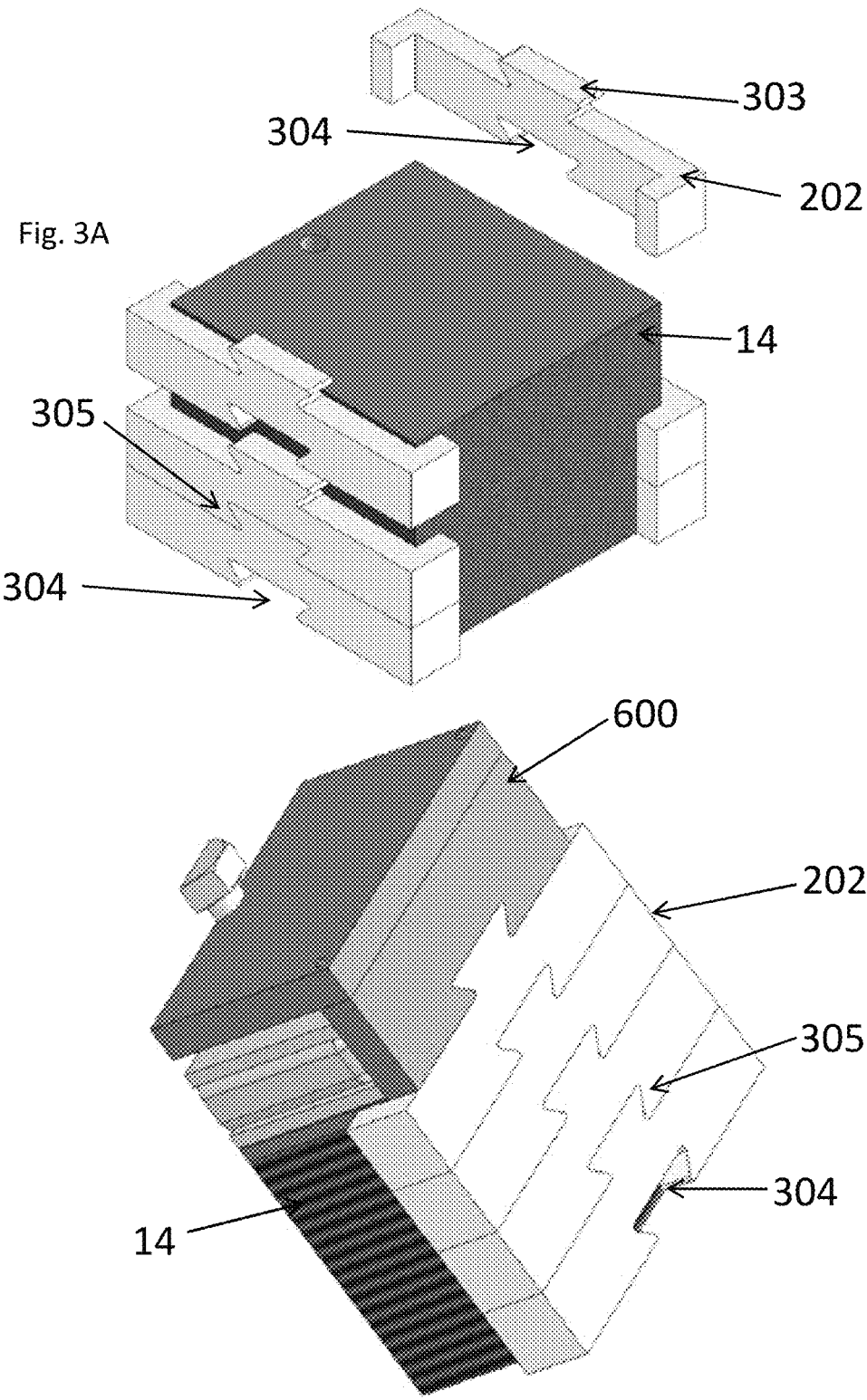
FIG. 3A illustrates a three dimensional view of an embodiment of plate shaped side baffles with dovetail connections.
FIG. 3B illustrates a three dimensional view of the embodiment of FIG. 3A with a spring compression assembly attached to the side baffles.
Figure 4:
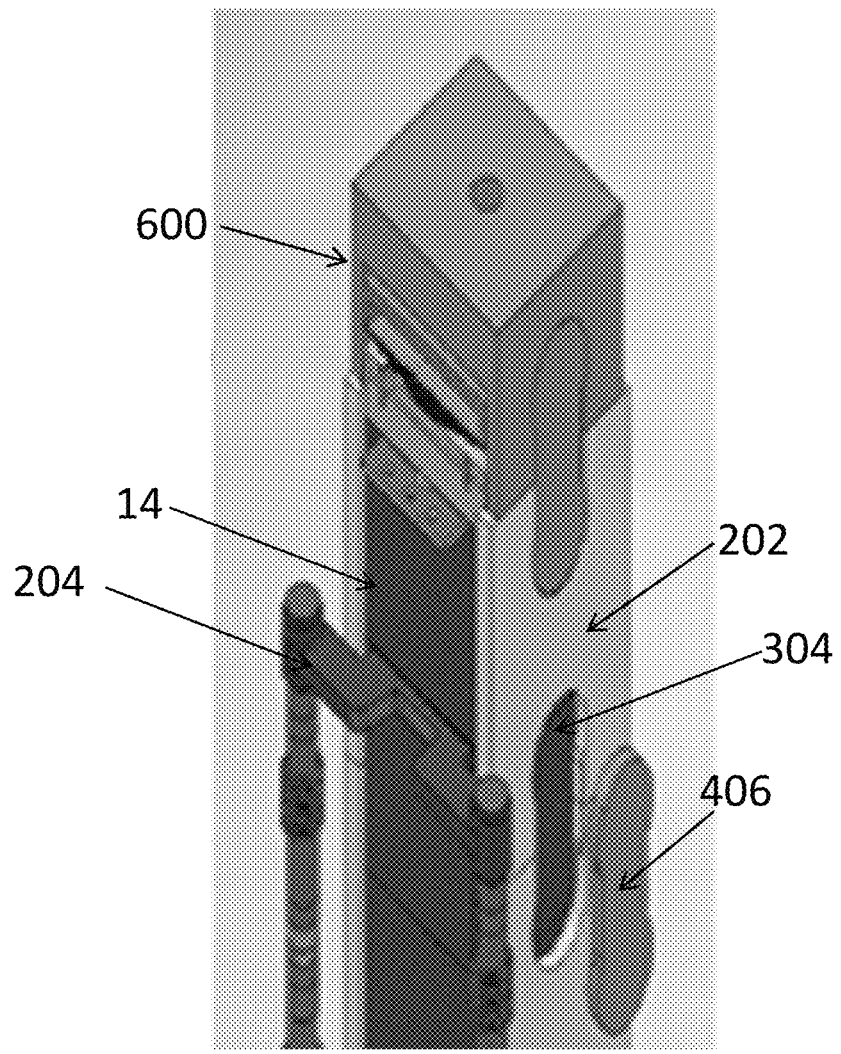
FIG. 4 illustrates a three dimensional view of an embodiment of plate shaped side baffles with dovetail connections and bow tie/dog bone connectors.
Figure 5:
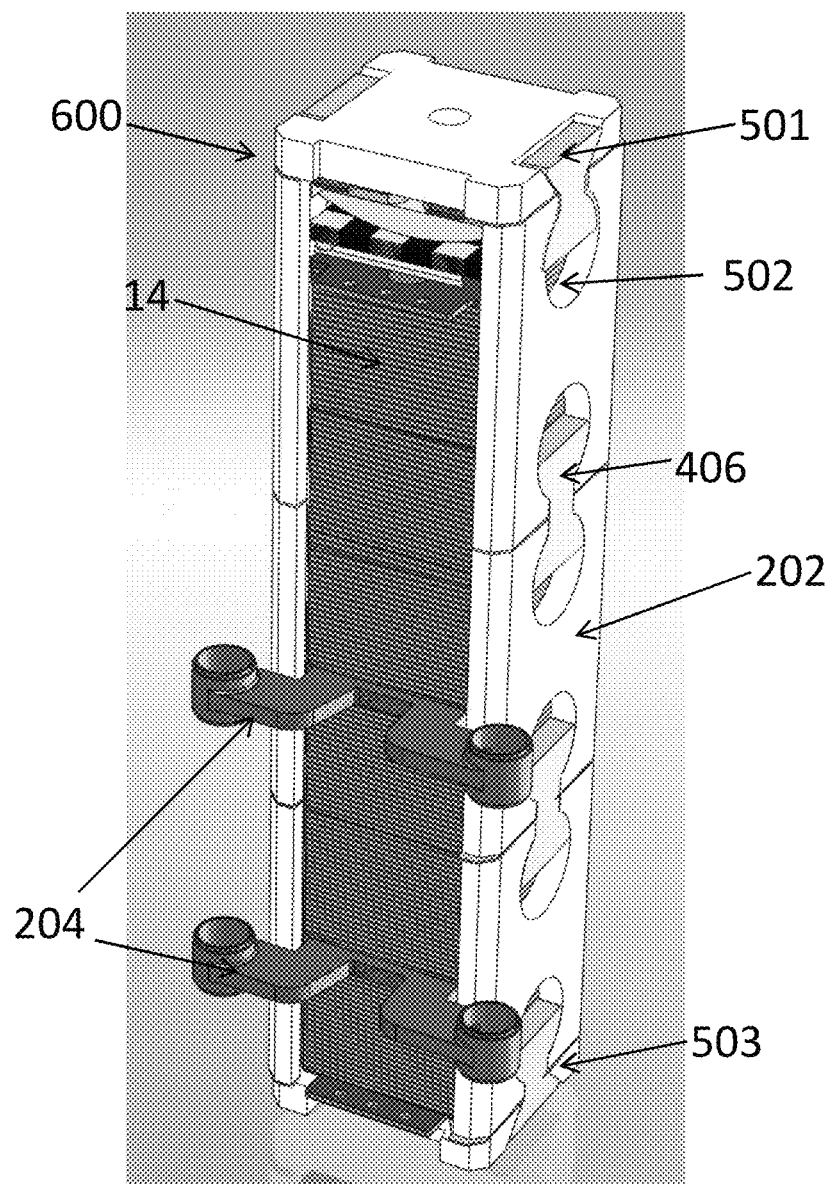
FIG. 5 illustrates a three dimensional view of an embodiment of plate shaped side baffles with dovetail connections and non-space filling bow tie/dog bone connectors.

The baffle plates 202 may be pieced together as shown in the FIGS. 3-5. For example, the ceramic plate shaped baffle plates 202 may be attached to each other using dovetails 305, as shown in FIGS. 3A and 3B. More generally, the ceramic plate shaped baffles 202 may include one or more protrusions 303 on one side and one or more cutouts 304 on the opposite side. The protrusions 303 and cutouts 304 may be angled as in the illustrated dovetails 305 or may be rounded as in a typical jigsaw piece, or other suitable shapes. The protrusions 303 (and the mating cutout 304) may, for example, have a more complex shape such as a shamrock shape. As shown in FIG. 3B, the protrusions 303 (or alternatively the cutouts 304) may also be used to attach the baffles to a spring compression assembly 600 (discussed in more detail below) which may be used to add a compressive load to the fuel cell stack 14.

In an alternative configuration shown in FIG. 4, bow tie shaped ceramic inserts 406 are used to form a connection between baffle plates 202. The inserts 406 preferably comprise plate shaped inserts having a narrower middle portion and two wider end or dovetail portions. The end portions may be rounded (i.e., a dog bone type bow tie shaped inserts). The end portions of the bow tie shaped inserts 406 are fitted into corresponding circular or quasi-circular cutouts 304 in the baffle plates 202. In this embodiment, the ceramic plate shaped baffle plates 202 may include one or more cutouts 304 on opposite sides of the baffle plate 202. In this configuration, the end portions of the inserts completely fill the cutouts. This configuration increases the overall strength of the baffle 220 relative to the previous embodiment and provides less stress at the contact point between the baffle plates 202. The inserts 406 may comprise the same material (e.g., alumina or CMC) or a different material from the material of the baffle plates 202. Further, analogously to the previous embodiment, the bow tie shaped inserts 406 may be used to connect the top baffle plate 202 to a spring compression assembly 600 by placing the insert(s) in respective cutouts in the top baffle plate 202 and an element (e.g., block 603) of the assembly 600.

In another alternative embodiment shown in FIG. 5, the inserts 406 do not completely fill the circular or quasi-circular cutouts 304 in the baffle plates 202. The inserts 406 still have a generally bow tie shape, but include flat edges 501 rather than fully rounded edges. Thus, empty space 502 remains in the respective cutouts 304 above or below the inserts 406.

The baffle plates 202 may be attached to the base 239 of the system using a dovetail 305 with sharp edges, such as those in FIG. 3 or a bow tie shaped inserts 406, such as those shown in FIG. 4. In an alternative configuration, FIG. 5 shows a column of stacks 14 attached to a linkage block 503 located below the column rather than being attached directly to the system base 239. The load on the column is provided from the linkage block 503 to create a "cage" around the column. For example, the linkage block 503 may comprise a ceramic material, such as alumina or CMC, which is separately attached (e.g., by the inserts, dovetails or other implements) to the ceramic baffles and to the system base 239. The use of the ceramic block material minimizes creation of heat sinks and eliminates the problem of linking the ceramic baffles to a metal base which introduces thermal expansion interface problems.

The dovetail protrusion 303 shown in FIGS. 3A and 3B preferably extends from the base 239 or linkage block 503 into the bottom baffle plate 202. Alternatively, the bow tie shaped insert 406 may be used to attach the bottom baffle plate 202 to the base or linkage block 503 as shown in FIG. 5 by being inserted into respective cutouts in plate 202 and block 503. However, in other configurations, the protrusion 303 may instead extend from the bottom baffle plate 302 into the base 239 or the linkage block 503. Any other suitable attachment methods other than dovetails 305 or inserts 406 may also be used. FIGS. 4-5 also show fuel distribution manifolds 204 between the stacks in the stack column and fuel inlet and exhaust conduits connected to the manifolds.

Figure 6:
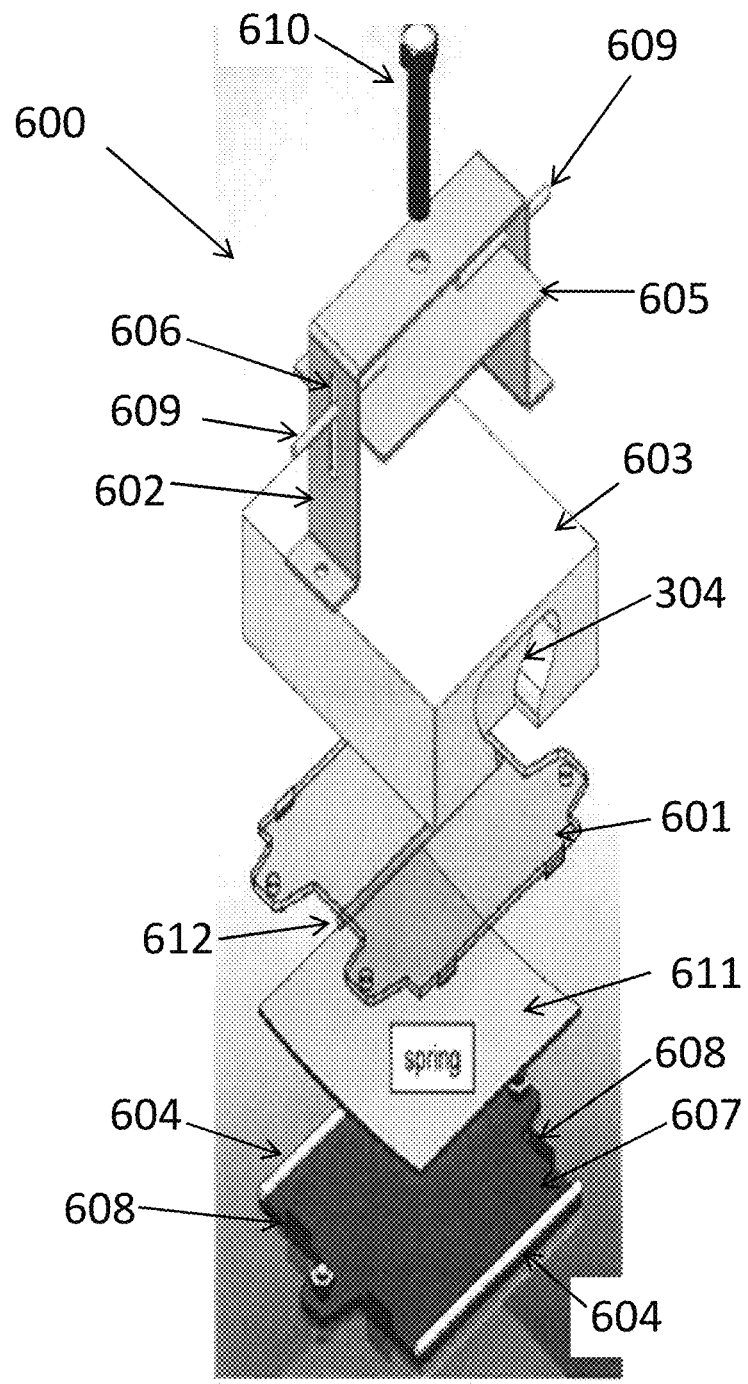
FIG. 6 illustrates a three dimensional view of an embodiment of a spring compression device.

FIG. 6 illustrates an embodiment of a spring compression assembly 600 that may be used in conjunction with any of the side baffle assemblies 220 described above. The spring compression assembly 600 may be used to apply a compressive load to a fuel cell stack 14 or column of fuel cell stacks 14. The spring compression assembly 600 includes a spring 611. As illustrated, spring 611 is a ceramic (e.g., CMC or alumina) leaf spring. A CMC spring is advantageous because it may include creep resistant fibers arranged in a direction in the matrix which resists creep. The ceramic spring can exist in a high temperature zone and allow for travel from differential thermal expansion from components applying the load to the stack. However, any other type of spring or combination of springs may be used. For example, the spring 611 may be a coil spring, a torsion spring, or a volute spring.

The spring compression assembly 600 may include a bottom plate 607 configured to provide a resilient surface against which the spring 611 can generate a compressive load. Preferably, the bottom plate 607 includes retention barriers 608 configured to prevent the spring 611 from sliding off the bottom plate 607. When using a leaf spring, the bottom plate 607 may also include spring supports 604. In this configuration, the spring 611 may be placed on top of the spring supports 604 (e.g., rod or bar shaped protrusions or ridges in plate 607) in an unstressed condition (see also FIG. 7).

In an embodiment, an upper plate 601 is provided on top of the spring 611, that is, on the opposite side of the spring 611 from the bottom plate 607. The upper plate 601 may include a spring tensioner 612, in this embodiment a rod, on the bottom of the upper plate 601. The spring tensioner 612 is preferably located approximately in the center of the upper plate 601. The spring compression assembly 600 may also be provided with an upper block 603 which may include either cutouts 304 (which accept inserts 406 from baffles as illustrated) or protrusions 303 by which spring compression assembly 600 may be attached to the side baffles 220.

A temporary tightening mechanism may be attached over or to the spring compression assembly 600 during the process of connecting the assembly to the baffles 220. In the embodiment of FIG. 6, this mechanism includes a bracket 602. The bracket 602 may be affixed to the bottom plate 607 by bolts as illustrated or by any other suitable mechanism. Movably attached to the bracket 602 is a temporary tensioner which in this embodiment comprises a pressure plate 605. As illustrated, the pressure plate 605 is movably attached to the bracket 602 by way of rods 609 which slide in elongated slots 606.

The compression load applied by the spring compression assembly 600 may be adjusted via a pressure adjusting mechanism 610. The pressure adjusting mechanism 610 may be, for example, a screw or bolt which may be raised or lowered by rotating. In the embodiment illustrated in FIG. 6, lowering the pressure adjusting mechanism 606 causes the pressure plate 605 to travel downward. As the pressure plate 605 lowers, it forces the upper block 603 and the upper plate 601 to lower as well. When the upper plate 601 lowers, the spring tensioner 612 is forced against the center of the spring 611, causing it to bend and thereby apply a load to the spring 611.

In use, the pressure adjusting mechanism 610 is lowered (and the spring 611 compressed) until the upper block 603 can be connected (e.g., hooked) to the side baffles 220. Once the side baffles 220 are connected via dovetails, inserts or other implements, the pressure adjusting mechanism 610 is loosened to release the bracket 602. The force of the spring 611, previously "held" by the pressure adjusting mechanism 610, is now transferred to the side baffles 220. Adjustment of the compressive force on the stack may be attained by fitting shims (not shown) between the spring compression assembly 600 and the top of the stack 14 (which sits below the bottom plate 607 of the spring compression assembly 600). More shims create a tighter compression. The pressure adjusting mechanism 610 provides pretension to allow connection of the assembly 600 to the side baffles 220. The bracket 602, including mechanism 610 and elements 605, 606 and 609 are then removed from the fuel cell column before the column is placed into an operating mode.

Figure 7:
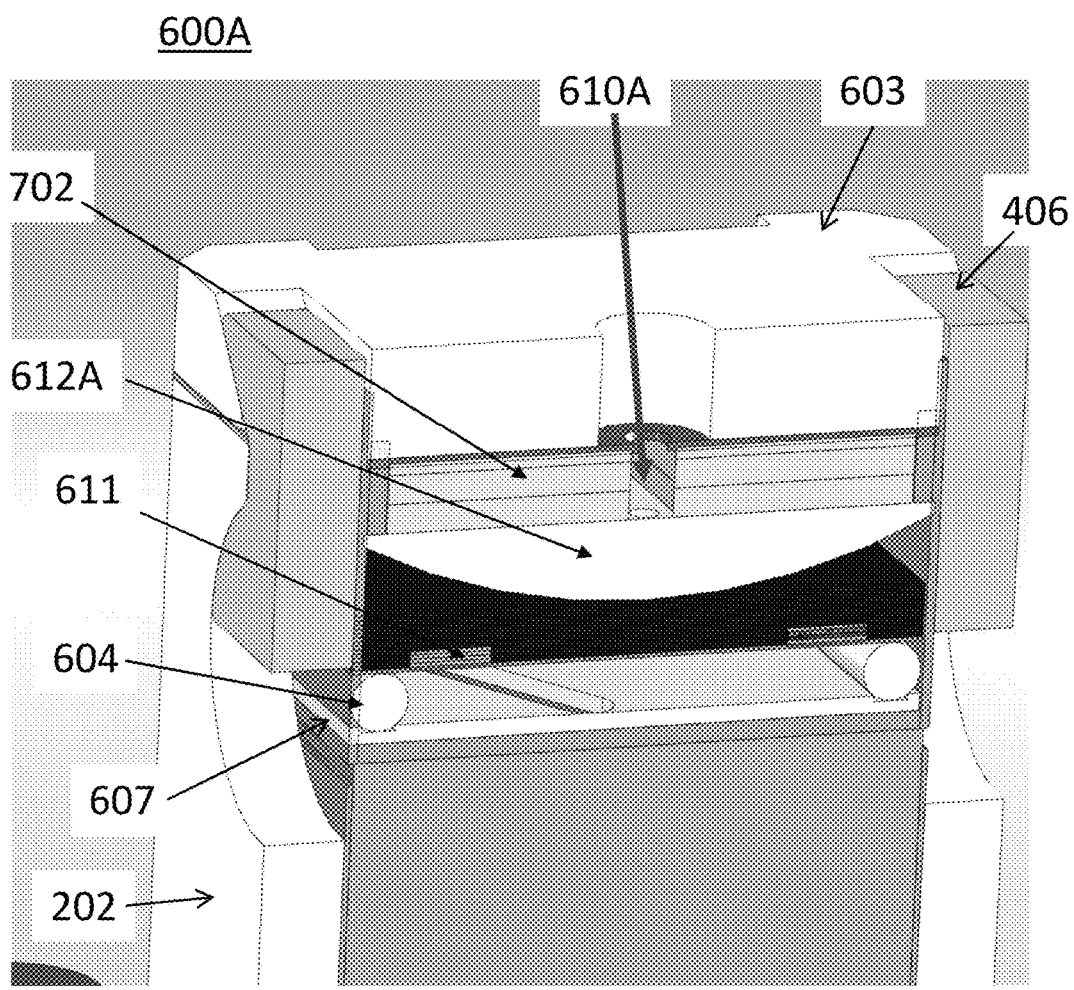
FIG. 7 illustrates a three dimensional view of another embodiment of a spring compression device.

FIG. 7 illustrates another embodiment of a spring compression assembly 600A. This embodiment is similar to the previous embodiment. However, the rod shaped spring tensioner 612 is replaced with a dome shaped spring tensioner 612A, where the curved side of the dome is in contact with the upper surface of the spring. Rod shaped spring supports 604 contact edge portions of a lower surface of the spring 611 to induce bending in the spring. Additionally, this embodiment includes spacers 702 which reduces the distance between the block 603 and the spring 611, thereby reducing the amount of adjustment required with the temporary tightening mechanism, such as a bolt or screw (not shown for clarity) to apply a load to the spring 611 through opening 610A.

Figure 8:
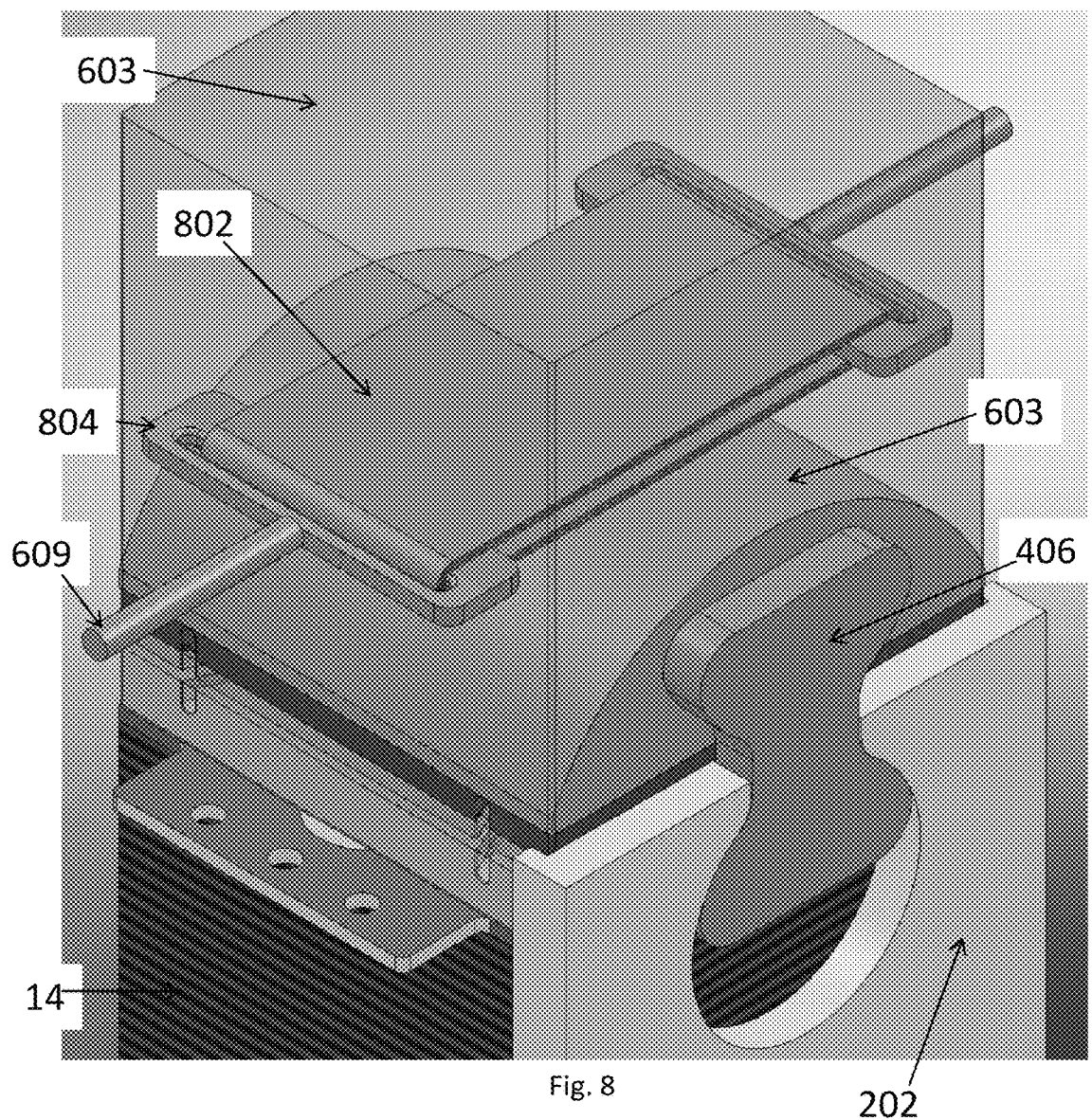
FIG. 8 a three dimensional view of illustrates another embodiment of a spring compression device with a tension band.
Figure 9:
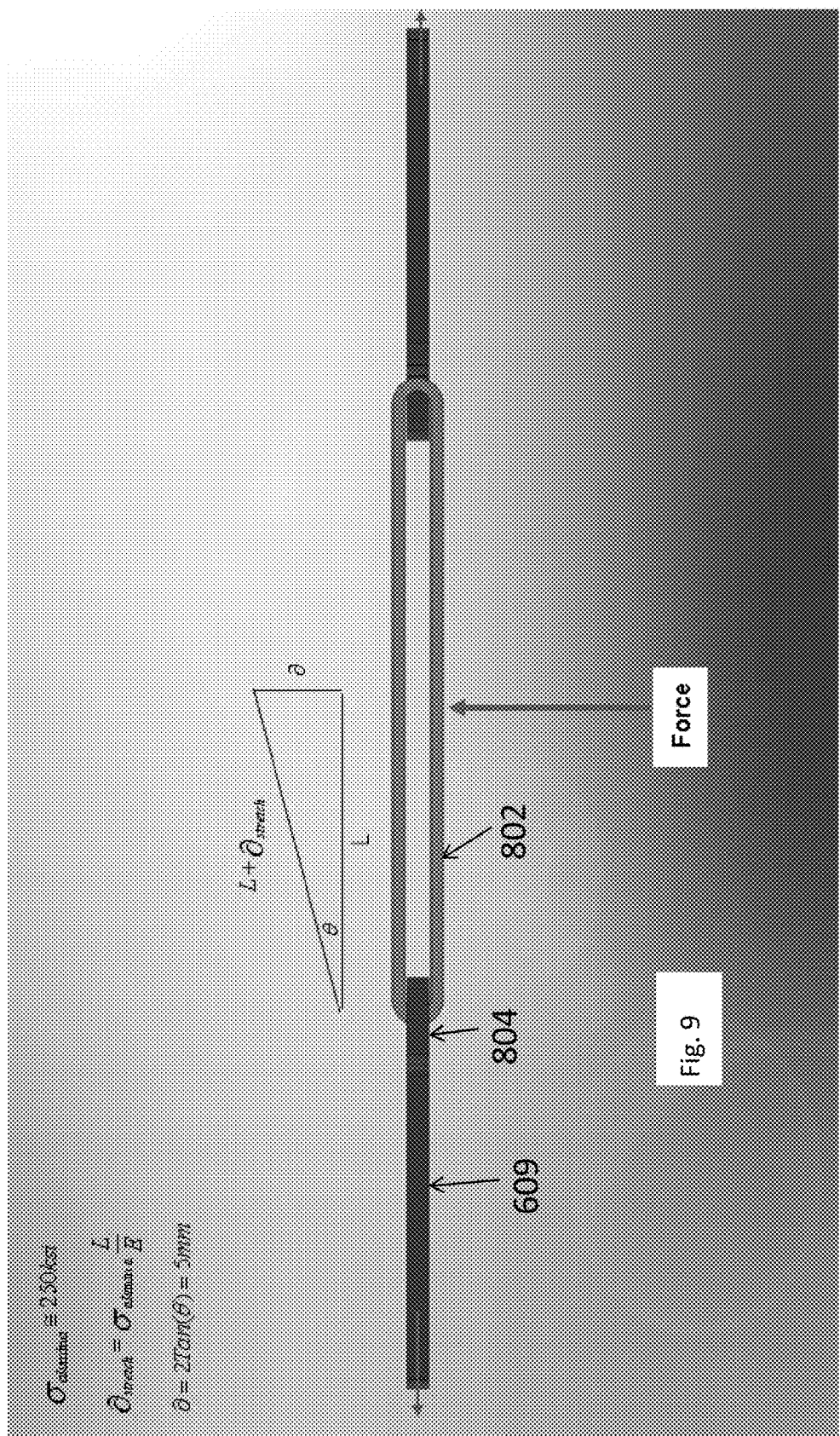
FIG. 9 is a side view of a portion of the spring compression device of FIG. 8 with an explanatory force diagram.

FIGS. 8 and 9 illustrate yet another embodiment of a compression assembly 600B. In this embodiment, the assembly includes tension band 802 located below the block 603. The assembly 600B preferably uses the tension band 802 in place of the leaf spring. However, if desired, the tension band may be used in combination with a spring described in prior embodiments. The tension band 802 may be attached to pull rods or handles 609 via buckles or other attachments 804. In this embodiment, the rods 609 are pulled apart by an external mechanism (not shown) to stretch the tension band 802 and exert a downward force on the spring tensioner 612B. In this embodiment, the tensioner 612B may be an upwards facing dome which receives the downward force from the band 802. The band 802 is permanently retained in the assembly 600B and the band is made of a high temperature tolerant material. As illustrated in FIG. 9, the force in the tension band 802 is related to the yield strength of the tension band 802 material, the amount of deflection θ of the tension band 802 and the length L of the tension band 802 (which is varied by the amount of force exerted on the handles 609). Thus, the amount of compression added to the stack can be precisely predetermined by selecting the material, length L and amount of deflection θ.

Figure 10:
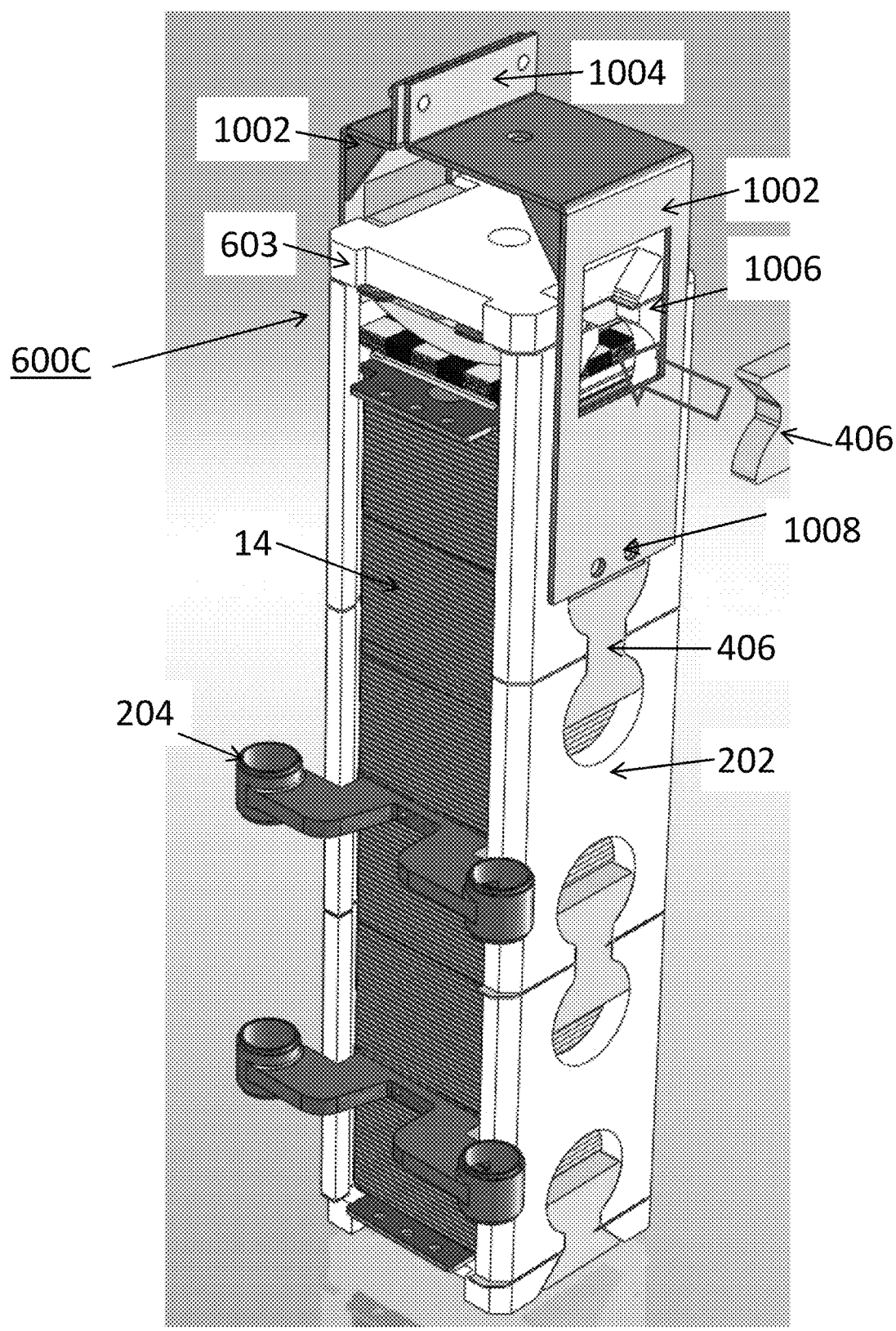
FIG. 10 illustrates a three dimensional view of an external bracket which may be used to supply compression to a spring compression device.

FIG. 10 illustrates another embodiment of a temporary tightening mechanism which comprises an external bracket 1002 which may be used to supply compression to a spring compression assembly 600C (e.g., an assembly comprising a dome tensioner similar to that shown in FIG. 7). In this embodiment, two external brackets 1002 may be assembled on top of the spring compression assembly 600C via flanges 1004 in the brackets 1002. Pressure may be applied to the external brackets 1002 by applying force to the top of the external brackets 1002 or pulling down on the external brackets by attachment of an external force to the external brackets 1002 via holes 1008 in the external brackets 1002. When sufficient compression of the column of fuel cell stacks 14 is achieved, a bow tie insert 406 may be inserted through an opening or window 1006 in the side of the external bracket 1002 to attach the side baffle 220 to the upper block 603.

Thus, as described in the above embodiments, the thermal expansion of the stack or column (the element compressed) should be balanced against the thermal expansion of the clamping mechanism (which is primarily the baffles and/or the spring) such that the desired amount of force on the stack or column is attained when the stack or column reaches operating temperature.

Furthermore, as described in the above embodiments, the compression mechanism (i.e., the compression assembly 600 to 600C) is connected to the baffles 220 by attaching a temporary tightening mechanism, such as the above described bracket, bolt or screw over the compression mechanism 600 to 600C, providing an additional compressive stress on the stack 14 and the compression mechanism using the tightening mechanism (e.g., lowering the pressure plate in a bracket, tightening the bolt or screw, stretching the tension band, pulling down on the bracket, etc.), coupling the compression mechanism to the side baffles (e.g., using dovetails 305 or inserts 406 to attach the block 603 to the top baffle plate 202), and removing the temporary tightening mechanism.

Figure 11:
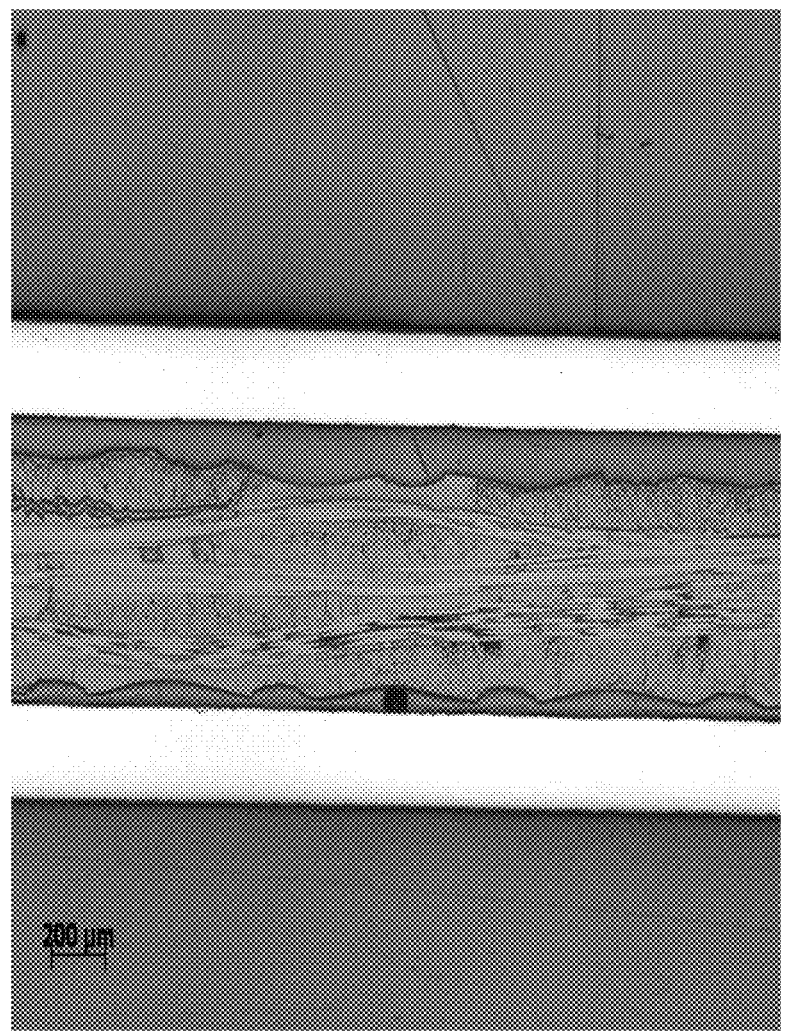
FIG. 11 is a micrograph illustrating the microstructure of a ceramic matrix composite (CMC) that may be used in the side baffles, bow tie connectors or leaf spring.
Figure 12:
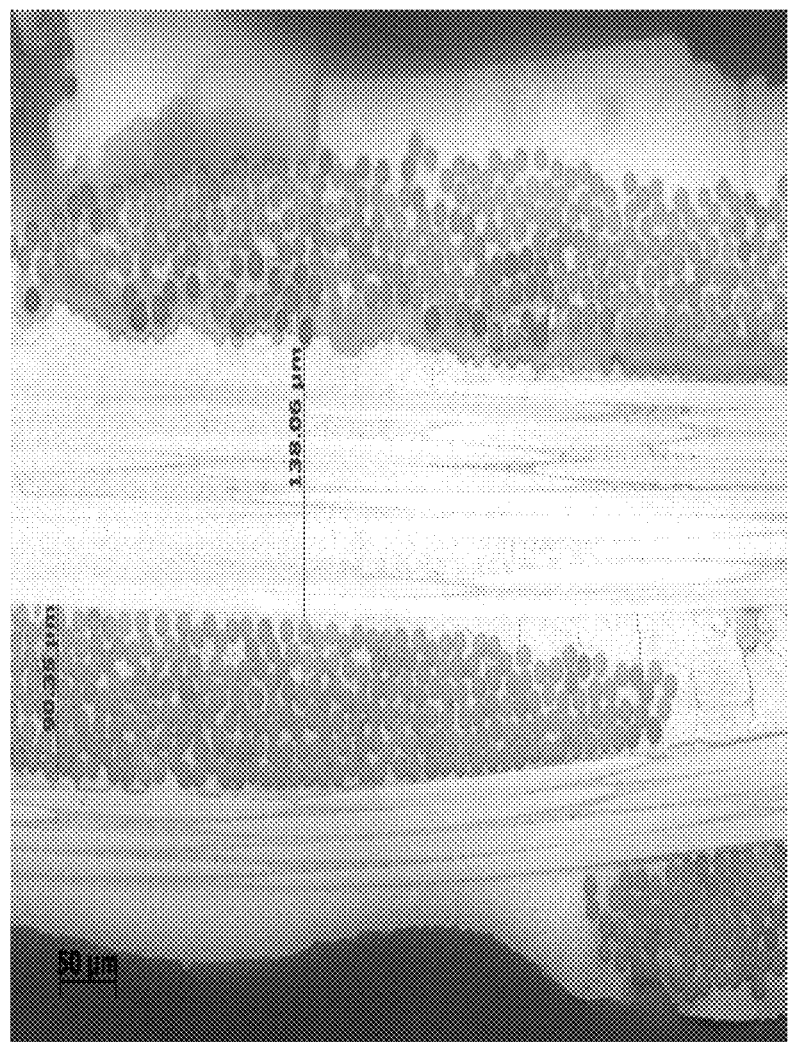
FIG. 12 is a micrograph of the CMC of FIG. 11 at a higher magnification.
Figure 13:
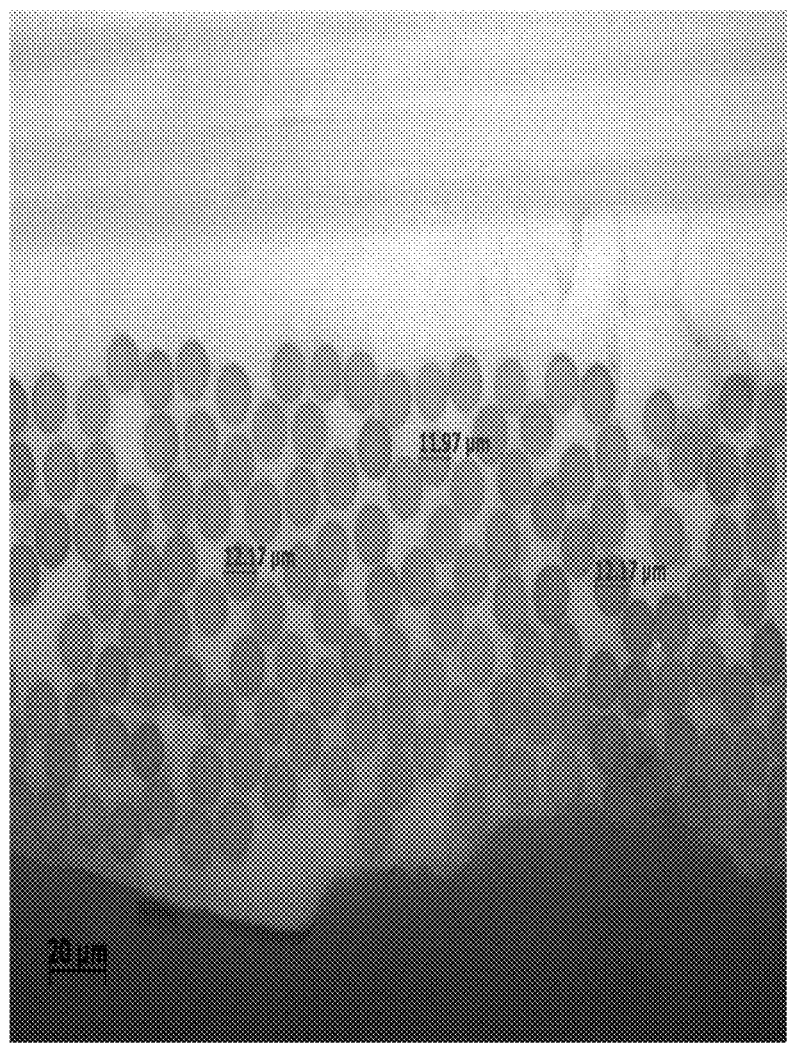
FIG. 13 is a micrograph of the CMC of FIGS. 11 and 12 at a higher magnification.

FIGS. 11-13 are micrographs of a representative CMC that may be used for the spring element 611. The side baffle plates 202 and/or the inserts 302 may also be made of a CMC material. The CMC illustrated in FIGS. 7-9 have an alumina matrix and alumina fibers. Other CMC materials may be used. The particular CMC illustrated has a matrix with elongated grains and fibers having circular or ellipsoidal cross sections. Other microstructures may also be used including, but not limited to, equiaxed grains and woven fibers. In the illustrated embodiment, the fibers have a diameter of approximately 12 microns. Fiber with other diameters may be used including, but not limited to 1, 2, 3, 4, 5, 10, 15, 20, 25, 50, and 100 microns.

Figure 14:
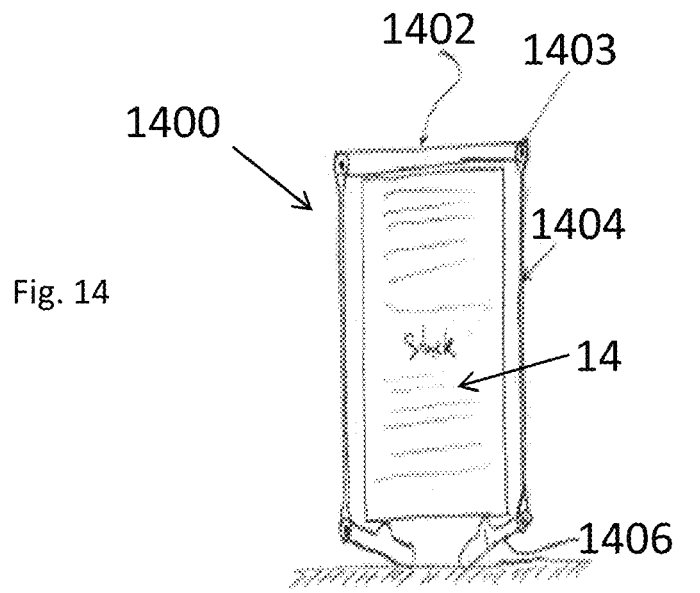
FIG. 14 illustrates a side view of an embodiment of an internal compression device.

FIGS. 14-17 illustrate embodiments of fuel cell stacks 14 with an internal compression device 1400. The internal compression devices 1400 are configured to use gravity and the mass of the fuel cell stack 14 to provide a compressive force on the fuel cell stack. FIG. 14 illustrates an embodiment in which the internal compression device 1400 includes a rigid cross member 1402 located across the top of the fuel cell stack 14. Attached to the rigid cross member 1402 by means of a pivot member 1403 and located adjacent to at least two sides of the fuel cell stack 14 are tension members 1404. The internal compression device 1400 also includes levers 1406 attached to the tension members 1404 (e.g., wires or rod). The levers 1406 are located below the fuel cell stack 14. Further, the levers 1406 are configured to transfer force due to the mass of the fuel stack and gravity to the tension members 1404 and thereby provide compressive force on the fuel cell stack 14.

Figure 15:
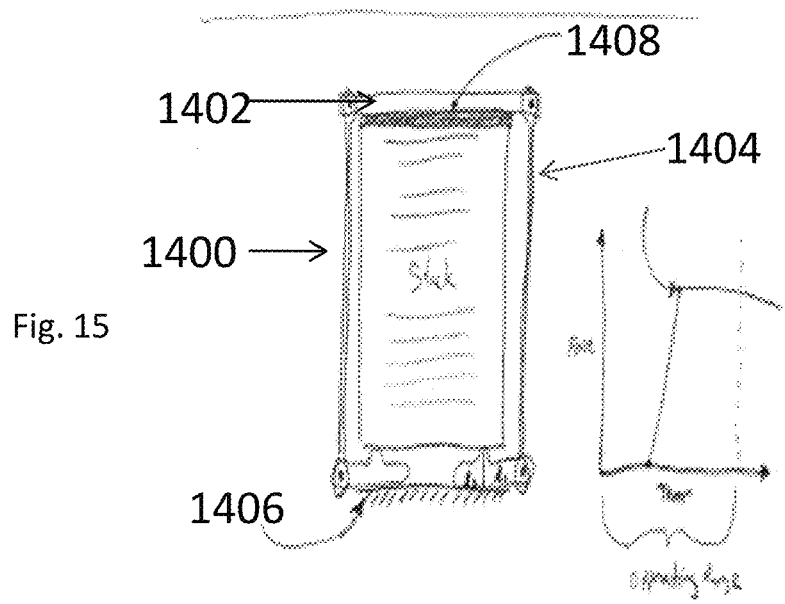
FIG. 15 illustrates a side view of another embodiment of an internal compression device.

FIG. 15 illustrates another embodiment of the internal compression device 1400. This embodiment also includes a rigid cross member 1402 located across the top of the fuel cell stack 14, tension members 1404 located adjacent the sides of the fuel cell stack 14 and levers 1406 located below the fuel cell stack 14. In this embodiment, however, the fuel cell stack may include a plate 1408 made of a high coefficient of thermal expansion (CTE) material under the rigid cross member. As the temperature increases in the fuel cell stack 14, the plate 1408 expands generating upward stress on the rigid cross member 1402 and downward stress on the fuel cell stack 14.

In other aspects of this embodiment, the high CTE material may have alternative (that is non-plate) shapes. In this embodiment, the levers 1406 and the tension members 1404 are configured so that there is little or no force applied to the fuel cell stack 14 at room temperature. The high CTE material and its shape are selected so that when the fuel cell stack is at its operating temperature, the force generated by the expansion of the high CTE material generates a preselected compressive force which is applied to the fuel cell stack 14 via the tension members 1404 and the levers 1406.

Figure 16:
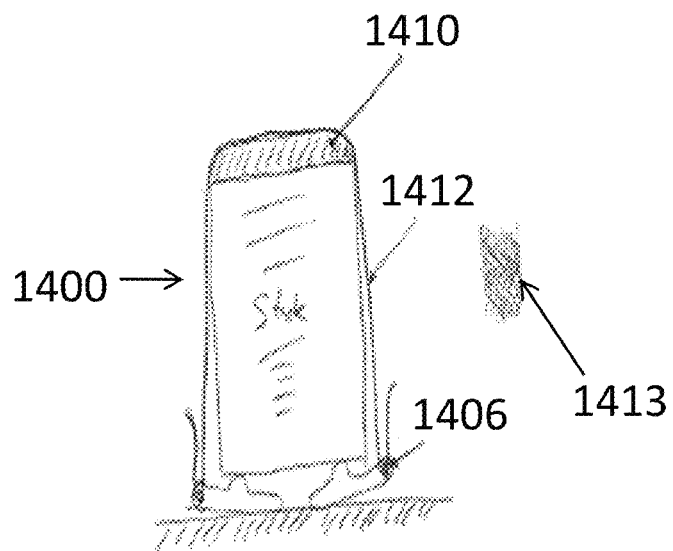
FIG. 16 illustrates a side view of another embodiment of an internal compression device.

FIG. 16 illustrates another embodiment of the internal compression device 1400. In this embodiment, the top of the fuel cell stack 14 has rounded edges 1010. Additionally, the internal compression device 1400 includes a strap 1412 over the top of the fuel cell stack 14 and running down at least two sides of the fuel cell stack 14. The strap may be made, for example, of a woven ceramic material 1413. Attached to the ends of the strap and located below the fuel cell stack 14 are levers 1406. The levers 1406 are configured to transfer force due to the mass of the fuel stack 14 and gravity to the strap 1412 and thereby provide the compressive force on the fuel cell stack 14.

Figure 17:
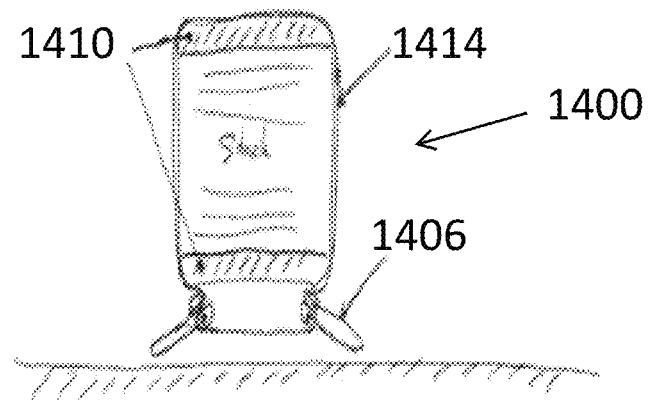
FIG. 17 illustrates a side view of another embodiment of an internal compression device.

FIG. 17 illustrates still another embodiment of the internal compression device 1400. In this embodiment, the top and the bottom of the fuel cell stack 14 have rounded edges. The internal compression device 1400, however, includes a closed loop belt 1414 around the periphery of the fuel cell stack 14. As in the previous embodiments, the internal compression device includes levers 1406 below the fuel cell stack 14. The levers 1406 are attached to the closed loop belt. The mass of the fuel stack 14 and gravity act on the levers 1406 and thereby provide the compressive force on the fuel cell stack.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A spring compression assembly configured to apply a load to a stack of electrochemical cells comprising:
    a ceramic leaf spring;
    a tensioner configured to apply pressure to a first side of the ceramic leaf spring; and
    a bottom plate located on a second side of the ceramic leaf spring opposite the first side of the ceramic leaf spring, the bottom plate configured to transfer a load from the ceramic leaf spring to the stack of electrochemical cells; and
    a ceramic block located on an end of the stack of electrochemical cells, the ceramic block interlocking with baffles located on one or more sides of the stack of electrochemical cells,
    wherein the tensioner comprises a dome shaped tensioner having a curved side in contact with an upper surface of the ceramic leaf spring, and further comprising cylindrical rod shaped spring supports contacting edge portions of a lower surface of the ceramic leaf spring.

2. The spring compression assembly of claim 1, wherein the tensioner comprises a rod which exerts a downward force on a central portion of an upper surface of the ceramic leaf spring.

3. The spring compression assembly of claim 1, wherein the ceramic leaf spring comprises a ceramic matrix composite (CMC) material and wherein the electrochemical cells comprise solid oxide fuel cells.

4. A solid oxide fuel cell assembly, comprising:
    the spring compression assembly of claim 1,
    the stack of electrochemical cells comprising a stack of solid oxide cells; and
    a baffle assembly configured to place a load on the stack of electrochemical cells and direct a reactant feed flow stream to the stack of electrochemical cells.

5. The assembly of claim 4, wherein the baffle assembly comprises a first vertically aligned baffle plate on a first side of the stack of electrochemical cells and a second vertically aligned baffle plate on an opposite second side of stack of electrochemical cells.

6. The assembly of claim 5, wherein the base interlocks with bottom of the first and second vertically aligned baffle plates.

7. The assembly of claim 6, wherein the first and second vertically aligned baffle plates do not comprise a through hole and wherein the reactant is an oxidant.

8. The assembly of claim 4, wherein the first and second vertically aligned baffle plates comprise a ceramic material.

9. The assembly of claim 8, wherein the ceramic material comprises a ceramic matrix composite (CMC).

10. The assembly of claim 9, wherein the CMC comprises a matrix comprising aluminum oxide, zirconium oxide or silicon carbide, and fibers comprising aluminum oxide, carbon or silicon carbide.

11. The assembly of claim 4, wherein:
    the stack of electrochemical cells is located in a column of solid oxide fuel cell stacks;
    the bottom plate is located over only a single column of solid oxide fuel cell stacks; and
    the spring compression assembly containing the ceramic leaf spring is located above the single column of solid oxide fuel cell stacks and is configured to apply the load to the single column of solid oxide fuel cell stacks.

12. The spring compression assembly of claim 1, wherein the rod shaped spring supports contact only edge portions of a lower surface of the ceramic leaf spring.

13. The spring compression assembly of claim 1, wherein the ceramic block contains cutouts configured to accept inserts from baffles to interlock the ceramic block with the baffles.

* * * * *